United States Patent
Harple et al.

(10) Patent No.: US 8,332,471 B2
(45) Date of Patent: Dec. 11, 2012

(54) SYSTEM FOR ENHANCED MANAGEMENT OF SOCIAL NETWORKS ON MOBILE DEVICES

(75) Inventors: Dan Harple, South Dartmouth, MA (US); Sam Critchley, Amsterdam (NL); Rich Pizzarro, Mechanicsburg, PA (US); Gavin Nicol, Barrington, RI (US)

(73) Assignee: GeoSolutions B.V., Amsterdam (NL)

( * ) Notice: Subject to any disclaimer, the term of this patent is extended or adjusted under 35 U.S.C. 154(b) by 442 days.

(21) Appl. No.: 12/510,854

(22) Filed: Jul. 28, 2009

(65) Prior Publication Data

US 2011/0029608 A1 Feb. 3, 2011

(51) Int. Cl.
*G06F 15/16* (2006.01)
(52) U.S. Cl. ........ 709/204; 709/201; 709/202; 709/207; 709/219; 705/319
(58) Field of Classification Search ........... 709/201–207
See application file for complete search history.

(56) References Cited

U.S. PATENT DOCUMENTS

| | | | |
|---|---|---|---|
| 2003/0009536 A1* | 1/2003 | Henderson et al. | 709/219 |
| 2006/0170760 A1* | 8/2006 | Anderson et al. | 348/14.04 |
| 2007/0031109 A1* | 2/2007 | Tsuboi et al. | 386/46 |
| 2007/0162487 A1* | 7/2007 | Frailey | 707/102 |
| 2009/0210480 A1* | 8/2009 | Sivasubramaniam et al. | 709/203 |
| 2009/0214039 A1* | 8/2009 | Chen et al. | 380/270 |
| 2009/0234910 A1* | 9/2009 | Chung et al. | 709/203 |
| 2010/0036912 A1* | 2/2010 | Rao | 709/204 |
| 2010/0062840 A1* | 3/2010 | Herrmann | 463/25 |
| 2010/0088246 A1* | 4/2010 | Lim | 705/319 |

* cited by examiner

*Primary Examiner* — Wing Chan
*Assistant Examiner* — Razu Miah
(74) *Attorney, Agent, or Firm* — Wilmer Cutler Pickering Hale and Dorr LLP

(57) ABSTRACT

A system and method for enhanced management of social networks and interaction therein on a mobile device. The system provides the user with a means to manage a plurality of online identifications and relationship databases with relationships automatically synchronizing between systems. The system further provides an automated means to manage social networks based on geospatial, social and temporal proximity, and a means to interact with other users, and to publish content, seamlessly, across online services and mobile devices.

18 Claims, 4 Drawing Sheets

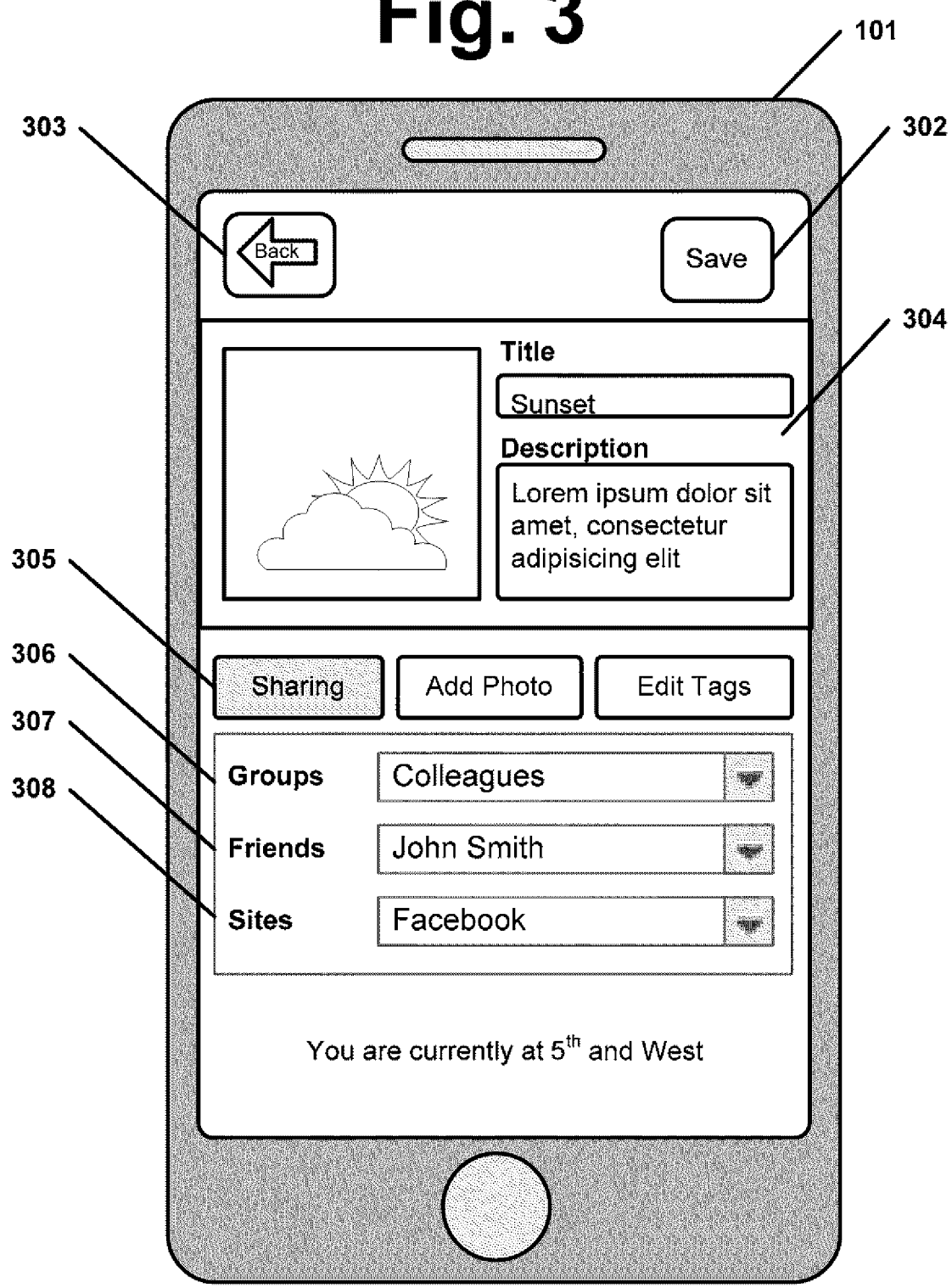

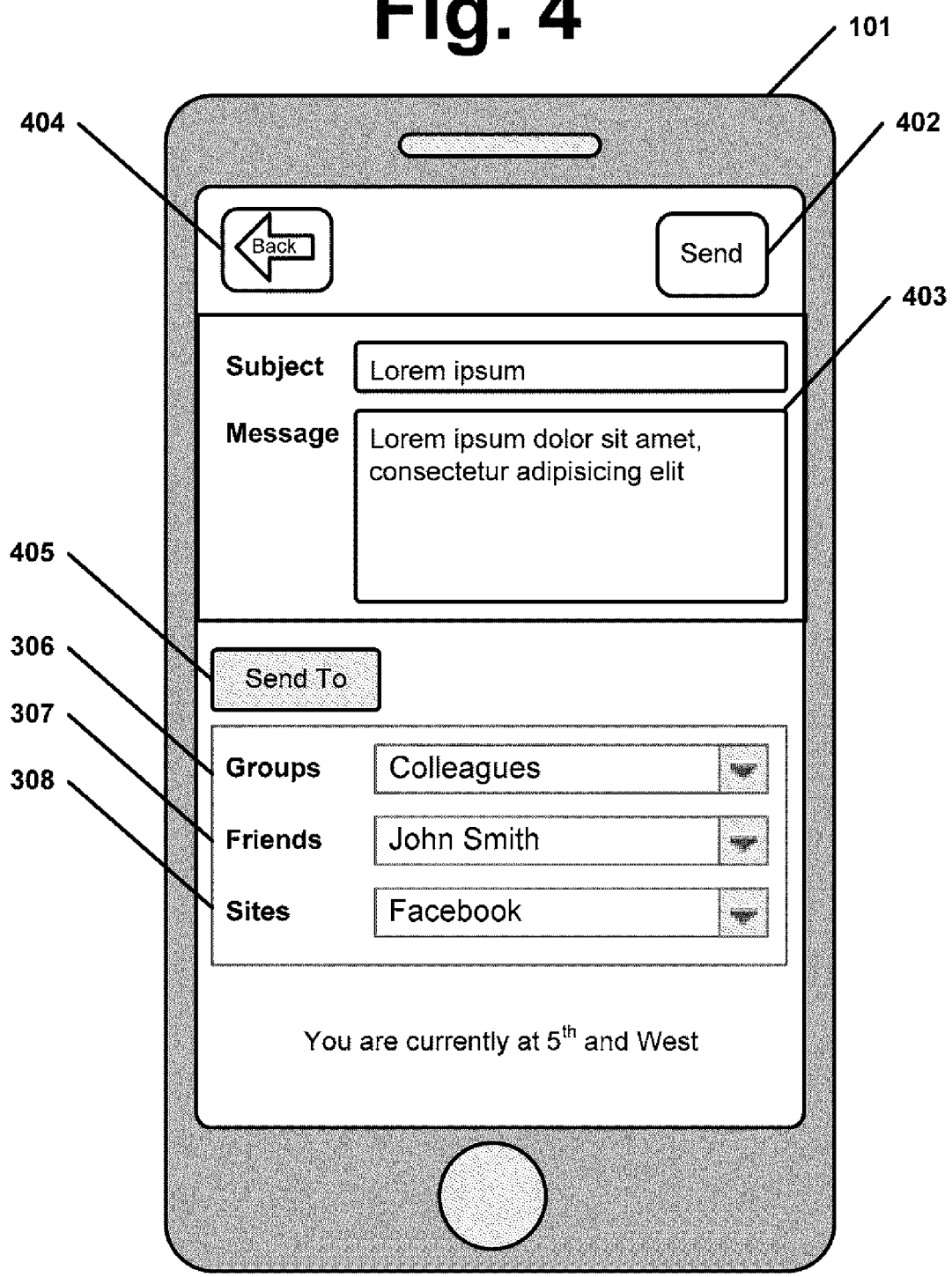

SYSTEM FOR ENHANCED MANAGEMENT OF SOCIAL NETWORKS ON MOBILE DEVICES

CROSS REFERENCE TO RELATED APPLICATION

This application is related to the following application, the entire contents of which is incorporated by reference: U.S. patent application Ser. No. 12/510,866, entitled "System For Creation Of Content With Correlated Geospatial And Virtual Locations By Mobile Device Users," filed concurrently herewith.

BACKGROUND OF INVENTION

The present invention relates generally to management of social networks and social network identities, and more specifically to a system and method for managing social networks, social network identities, and social interactions on mobile devices.

DESCRIPTION OF THE BACKGROUND ART

In the past, the vast majority of mobile devices served a single purpose, or a limited set of purposes: for example, mobile phones could be used to make or receive telephone calls, and possibly send small text messages, but little more. Likewise, Personal Information Management (PIM) devices would be used to manage schedules and contact lists, but little more.

There is a rapidly accelerating growth in the use of mobile devices, and in particular, mobile devices that have significant processing power. There is further a rapidly accelerating growth in mobile devices that provide a means for deriving the location of the devices. Modern mobile devices are, in essence, mobile general purpose computers that increasingly, have a means of deriving the current location of the device. This is bringing about a revolution in the way mobile devices are used, and the expectations owners of such devices have for them.

One aspect of change is that as owners of devices come to use mobile devices for more purposes, from making and receiving telephone calls to surfing the internet, the devices are becoming more intensely personal. No longer are mobile devices limited to storing a list of telephone numbers, or a calendar. Increasingly they store as much, if not more, personal information about the owner, as any other devices the user owns, including, but not limited to contact information, social network relationships and contact information for friends, web browsing history, and online account information.

Increasingly, owners of mobile devices participate in online social networks, such as MySpace, to the point that in many cases earlier PIM functionality, such as contact lists, and modes of contact, such as email, have become outdated. In addition, owners of mobile devices are often members of multiple online social networks, or use multiple online services. As these trends accelerate, it has become clear that the needs of owners of mobile devices are not being met. In particular, existing mobile device software typically reflects the needs of traditional cellular phones, or Personal Information Management devices, and provide little, or insufficient means to manage social network management and interaction.

Despite best efforts to date, it is clear that the needs of owners of mobile devices are not being met: the software on extant devices is poorly matched to the needs of an increasingly mobile and networked populace, especially in regard to the management of the constantly changing, complex online and offline relationships many owners of mobile devices have. Further, mobile devices seldom provide means for social interaction that model the mobile devices owners expectations.

SUMMARY OF INVENTION

Aspects of the present invention provide a system for enhanced management of the constantly changing, multifaceted relationships of owners of mobile devices. In particular, the system provides a means for managing online and offline relationships, and provides further means to automate management of said relationships. The system further provides as means for social interaction.

The system of the present invention is comprised of a software application installed on a mobile device, a relationship manager, and a messaging manager. The application has access to one or more sources of relationship data and a plurality of online services.

The software application on the mobile device communicates with the relationship manager and the messaging manager in order to send or retrieve relationship information updates and message information updates. The types of relationship updates include, but are not limited to, relationship addition, subtraction, contact update, and contact suggestions. The type of messages includes, but is not limited to, textual messages, suggestions, and links to relevant information.

The mobile device software will typically include one or more relationship databases. The application software of this invention extracts relevant information from that database in order to first create a set of relationships. This database is also updated when the application software communicates with the relationship manager.

The relationship manager maintains a canonical set of relationship information for a given mobile device owner. If an update to the relationship data is transmitted from the mobile device to the relationship manager, the relationship manager will further propagate that information to a plurality of online services, thereby automatically managing the synchronization of relationship databases across as many identities as the owner of the mobile device has. Likewise, if relationship data is altered on any of the plurality of online services, the relationship manager will detect the change and propagate the change to the mobile device (or devices) and the other online services.

Like the relationship manager, the message manager facilitates the synchronization of messages across disparate systems. Unlike the relationship manager, however, the message manager does not store a canonical set, but rather acts simply as a multicast relay.

In one embodiment, the mobile device will be a mobile phone, and the relationship database will be the contact database provided by the underlying mobile phone operating system. In this case, the contact database may, or may not be augmented by the application software provided by this embodiment in order to allow synchronization of the mobile device contact database and the relationship store. In a further embodiment, the mobile device may be a portable computer, in which case there may be one or more relationship databases provided by applications running on the underlying operating system: for example, an email contact database and an instant messaging friend database.

One, but not the only, embodiment of the message manager and relationship manager is as a web application exposed via HTTP, and using a relational database as storage. Those skilled in the art will understand that there are a multitude of possible implementations for such an embodiment, including, but not limited to, applications exposed by a protocol other than HTTP, and using database technologies other than relational databases.

In all embodiments, there is a need to be able to communicate with the online services over a network connection, using some form of programming interface. Some, but not all, online services will provide such an API, while others will require proprietary interfaces.

BRIEF DESCRIPTION OF DRAWINGS

FIG. 3 shows an example of a mobile device of the present invention.

FIG. 4 shows another example of a mobile device of the present invention.

DETAILED DESCRIPTION

Embodiments of a system for enhanced social networks using mobile devices is described. In the following description of aspects of the present invention, numerous specific details are given in order to provide a thorough understanding of the invention. One skilled in the relevant art should understand that other configurations and embodiments of the present invention are possible, without compromising the integrity of the underlying invention.

Identity and Relationship Management

Figure 1:
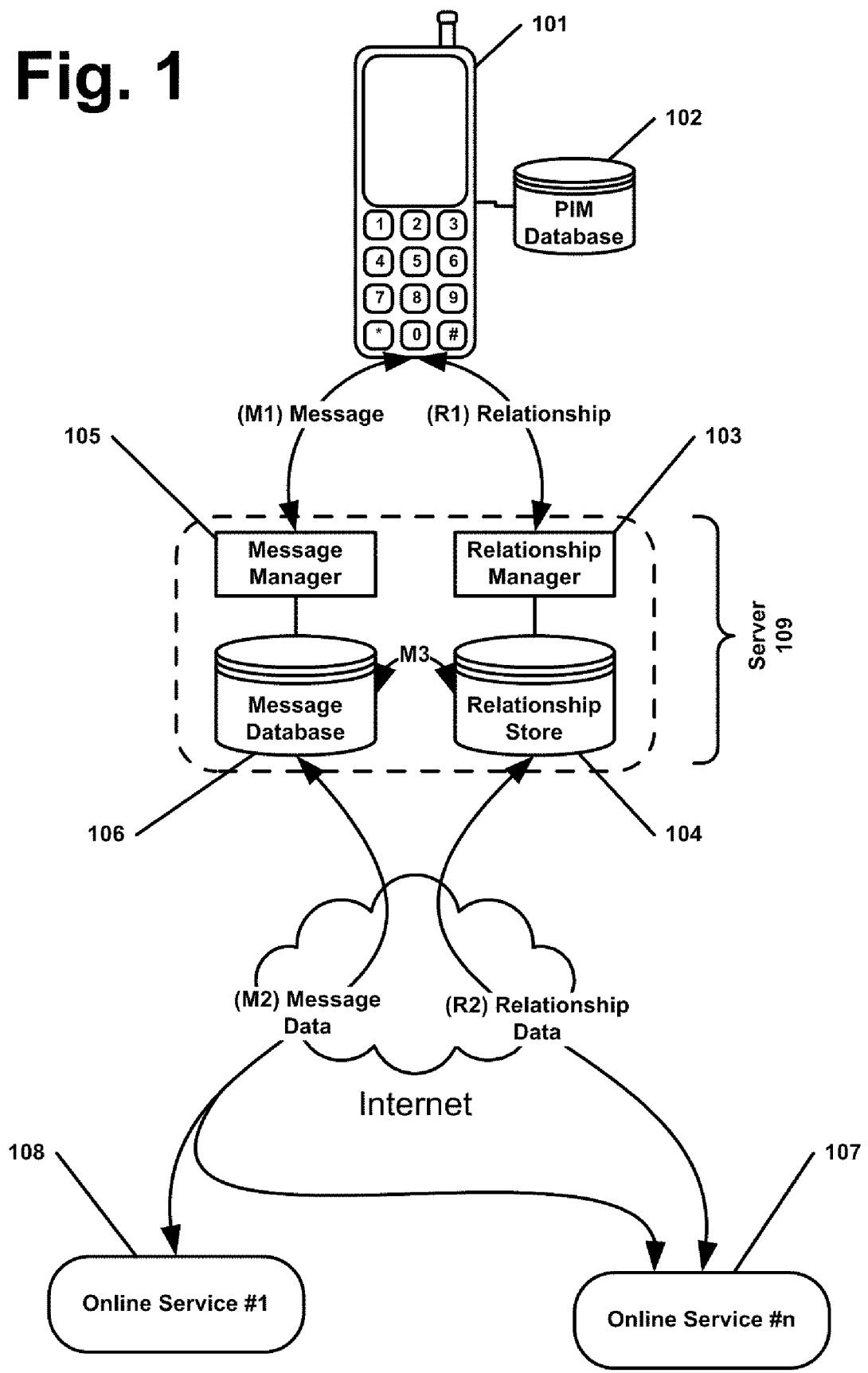
FIG. 1 shows the system according to one aspect of the invention and the major components.

In one embodiment, shown in FIG. 1, the system provides an enhanced means for managing a plurality of identities and social networks on mobile devices. This functionality is largely provided by relationship manager 103 and is described in detail below.

The relationship manager 103 as described in this embodiment is a web application running in web server 109, exposing an interface over the HTTP protocol, though other embodiments are possible, including, but not limited to embodiments using other network protocols, or even application software running on the mobile device itself.

When the mobile device user starts using the mobile device, the user is prompted to create an account in the relationship manager. In a preferred embodiment, the user will be prompted for a unique name and password to be used to authenticate the mobile device user against the relationship manager, in which case, the relationship manager component will manage authentication. In another embodiment, the mobile device user may be prompted for a name and password to be used by another service for authentication purposes, or may be prompted to entirely delegate authentication to an online service. In either embodiment, the relationship manager will have a means to authenticate the mobile device user, and to associate a unique identifier with the user for management purposes. This unique identifier is stored, and used as a key into relationship store 104. Relationship store 104 preferably takes the form of a relational database.

Having established a unique identity within relationship manager 103, the next step is to encourage the mobile device user to manage his or her relationships and to synchronize them. There many be a plurality of relationship databases and online services that need to be accessed, including, but not limited to the relationship databases on the mobile device, and relationship databases managed by other online services. As an example of the former, most mobile devices have at least one relationship database in the form of a contact database used to store contact information about friends and colleagues. Other relationship databases on mobile devices may include email databases, and Instant Message (IM) contact lists. It may or may not be possible to access such databases on mobile devices, or may be impractical to do so.

FIG. 1 shows the system according to one aspect of the invention and the major components, including mobile device 101, relationship database 102 on the device, relationship manager 103 and relationship store 104, message manager 105 and message store 106, server 109 holding those two services, and a plurality of online services 107, 108. In the context of FIG. 1, there is a single relationship database on mobile device 101 in the form of Personal Information Management (PIM) database 102. As part of the initial configuration of the application, the mobile device user is prompted for permission to access the local PIM database so that it can be synchronized with relationship store 104 via relationship manager 103. If the mobile device user grants permission, information is extracted from PIM database 102 and transmitted (R1) to relationship manager 103, which will then store the contact information into relationship store 104.

As part of this process, relationship manager 103 may, or may not, possibly at the mobile device users' discretion, contact people from the contact list, prompting them to also use the server to manage relationships. This enhances the social networking experience for mobile device users by possibly capturing latent network effects whereby the benefit of the service is increased dramatically by the number of people within a social network using the particular service.

In addition to the directly available relationship databases, the mobile device user may, or may not, be a member of one or more online services. The system of the present invention will give the mobile device user an opportunity to associate a plurality of online services with the account identified by the unique identifier for the mobile device user. Relationship manager 103 will store whatever authentication and access information is necessary to access the online services in relationship store 104. Once relationship manager 103 has the necessary information, it will then contact (R2) online service 107 using said information, and access the relationship data stored with online service 107.

Where there are discrepancies between relationship store 104 and online service 107, relationship manager 103 will first consolidate information into a canonical list in relationship store 104 in order to build a complete set of relationships. Relationship manager 104 may, or may not, possibly at the mobile device users' discretion, send a message to contacts added during this process, prompting them to also use the server to manage relationships. If a contact exists in relationship store 104 but not in online service 107, relationship manager 103 may, or may not, possibly at the discretion of the mobile device user, try to find an existing account on online service 107 that best matches the contact information the mobile device user has in their relationship store 104. For example, relationship manager 103 may search for users of online service 107 using an email address, telephone number, name, or any combination thereof in addition to any other available information. The primary purpose here is to, wherever possible, ensure that the relationship store, and by extension, the social network, of the mobile device user, are consistent everywhere.

Updates to relationship database 102 are immediately propagated to relationship manager 103, and thereby, to relationship store 104. Deletions result in the relationship being removed from relationship store 104 and, possibly at the discretion of the mobile device user, from online services 107, 108 associated with the unique identifier of the authenticated mobile device user. Additions will follow the procedure outlined earlier, whereby relationship additions that do not have a counterpart on online service 107 will create, possibly at the discretion of the mobile device user, a relationship, possibly including the necessity to search for accounts on online service 107 that are the same as the contact information stored in relationship store 104.

Relationship manager 103 may, possibly at the discretion of the mobile device user, also occasionally poll online services 107, 108 for changes to the relationships maintained in the service. Additions and deletions to such relationships will be noted by relationship manager 103, which will prompt the mobile device user to resolve how the change should be handled. For additions, the process of consolidation is that as outlined above, where relationship manager 103 will store the additional contact information into relationship store 104, possibly invoking the resolution mechanism outlined above to ensure consistency of the social network databases. Deletions will result first in the entry in the relationship store being marked as deleted on that particular online service. The mobile device user will then be prompted as to whether the deletion should proceed across all services and relationship databases, as outlined above.

Note that in many instances, online services 107, 108 may have a requirement for a relationship to be acknowledged before a relationship is allowed to be established. In many cases, this acknowledgement mechanism involves messaging systems and activities that fall outside the direct control of the present invention, but wherever possible, this interaction will also be managed by the system of the present invention.

In addition to the functionality outlined above, relationship manager 103 offers features and benefits beyond simple synchronization of relationships. In one embodiment, relationship manager 103 will act as a recommendation service, recommending additional contacts based on social proximity. For example, if John has a relationship with Bob, and Bob has a relationship with Dan, but not with John, relationship manager 103 may or may not, possibly at the discretion of the mobile device user, prompt Dan and John with a suggestion that they form a relationship. This recommendation may be based on direct social proximity, or on other social context information, such as, but not limited to shared hobbies and similar birthdays.

In addition, relationship manager 102 may recommend relationships based on non-social contextual information, such as, but not limited to, temporal proximity and geospatial proximity. Geospatial proximity may be established by comparing the mobile device users current known location, as extracted from the mobile device, using GPS or some other location resolution mechanism. If two mobile device users are near one another, relationship manager 103 may, possibly at the mobile device user's discretion, prompt them with a recommendation that they form a relationship. This geospatial proximity weighting might be combined with, or influence other measures, such as, but not limited to, social proximity. Temporal proximity, likewise, may or may not be combined with other measures in relationship manager 102 resulting in a prompt to form a relationship. For example, if two mobile device users were in the same area at the same time, especially if the location is indicative of a common interest (a reverse geographical lookup may be used to determine the name of a location, such as a stadium), the relationship manager may, possibly at the discretion of the mobile device user, prompt the two mobile device users to form a relationship.

The purpose of the above mechanisms are to provide a means for managing multiple online identities, and to manage, from a mobile device, the entirely of the mobile device users' social network, across a plurality of online services. In addition to the dynamic synchronization which vastly simplifies online management, relationship manager 103 provides a means to dynamically determine potential relationships between mobile device users that currently do not have an established relationship.

Message Management

In another embodiment, the system provides an enhanced means for sending and receiving messages from mobile devices and other users, or online services. Like relationship management, the primary purpose of this functionality is to simplify management of social interaction, across a plurality of online identities and online services 107, 108. The functionality is explained in detail below, in the context of a particular embodiment, but those skilled in the relevant art will realize that there are a number of alternate embodiments of this functionality.

FIG. 4 shows an example of mobile device 101 running application software for sending a message to other users. This includes button 402 to send the message, message composition area 403, button 405 to control who the message should be sent to, an area to select groups 306 to send the message to, an area to select specific users 307 to send the message to and an area to select online services 308 to post the message to. The screen has an area for composing a message 403 consisting of an area to enter a title and a message.

While this particular depiction is limited to sending textual messages, other formats, including, but not limited to audio, video, graphical, textual, or any combination thereof, is also possible.

Regardless of the particular means for creating a message, the system of the present invention will also provide a means to determine recipients 405 of the message. Unlike most mobile device applications that limit distribution to either an email address (for email application), or a phone number (for SMS message), a preferred embodiment of the present invention will contact relationship manager 103 to determine a list of groups 306, a list of people with established relationships 307 and a list of online services 308 to which the message may be sent.

Having determined how the message is to be propagated, the mobile device user will then choose to distribute the message by selecting the appropriate actions 402, or possibly cancel transmission. Referring to FIGS. 4 and 1, if the mobile device user chooses to transmit the message 402, the mobile device will contact (M1) message manager 105 on server 109. As a first step in further processing, message manager 105 will store the message in message database 106. Message database 106 is preferably a relational database augmented by a file system for storing large messages, though other embodiments, including, but not limited to, a purely relational database store are possible.

With the message stored in message database 106, message manager 105 then proceeds to distribute the message according to the wishes of the mobile device user. As a first step, message manager 105 contacts (M3) relationship manager 103 to resolve the groups, and online services specified during the message composition phase. A group is resolved to all members of the group, excluding the mobile device user. A selected online service is resolved to all members of the online service with whom the mobile device user has a relationship. At the end of the resolution phase, message manager 105 will have a canonical set of users the mobile device user has a relationship with, and will then attempt to send the message to each of those users.

The exact mechanism used to propagate a message to other users is determined primarily by the contact information associated with the relationship. If the mobile device user and the targeted message user both have accounts on server 109 with relationship manager 103 and message manager 105, the preferred embodiment adds the message to the set of received messages for the targeted message user. If the targeted message user has an account on online service 107, and online service 107 provides some messaging capability, the message is transmitted (M2) to online service 107. A similar flow is followed if the contact information includes information about email accounts, IM accounts, etc. Based on the mobile device user preferences, message manager 105 will make a best attempt to transmit the message to all targeted recipients, using the preferred means for doing so.

In addition to providing a means to send messages to a plurality of recipients, including recipients on other online services 107, 108, message manager 105 provides a means to receive messages from a plurality of online services, using a plurality of identities. Except in the instance where a message has been directly transmitted between two users of the service, message manager 105 will need to periodically connect to online service 107 and retrieve messages (M2) in order to provide a consolidated view to the mobile device user. When the message manager connects to online service 107 and retrieves the messages (M2), it will store the retrieved messages in message database 106 and, at the discretion of the mobile device user, delete the messages from online service 107. Again, message database 106 is preferably a relational database. This consolidated message list is made available to the mobile device user, thereby providing a consolidated means to send and retrieve messages.

As noted earlier, messages may take the form of a text message, an audio message, a video message, a graphical message, or any combination thereof. A message may further be a message from one user to another, or may take the form of a message from online service 107. For example, if a user of online service 107 updates their status, a 'status notification' message may be generated and retrieved (M2) by message manager 105. This may or may not be at the discretion of the mobile device user, but has the effect of seamlessly tying together the disparate social networks represented by the plurality of online services 107, 108.

Content Management

In a further embodiment, the system provides an enhanced means for capturing and sharing content on mobile devices taking social context into consideration. Like message management, the primary purpose of this functionality is to provide a simplified means to distribute content within the mobile device users larger social network, and to thereby provide a simpler, more pleasurable experience.

Figure 2:
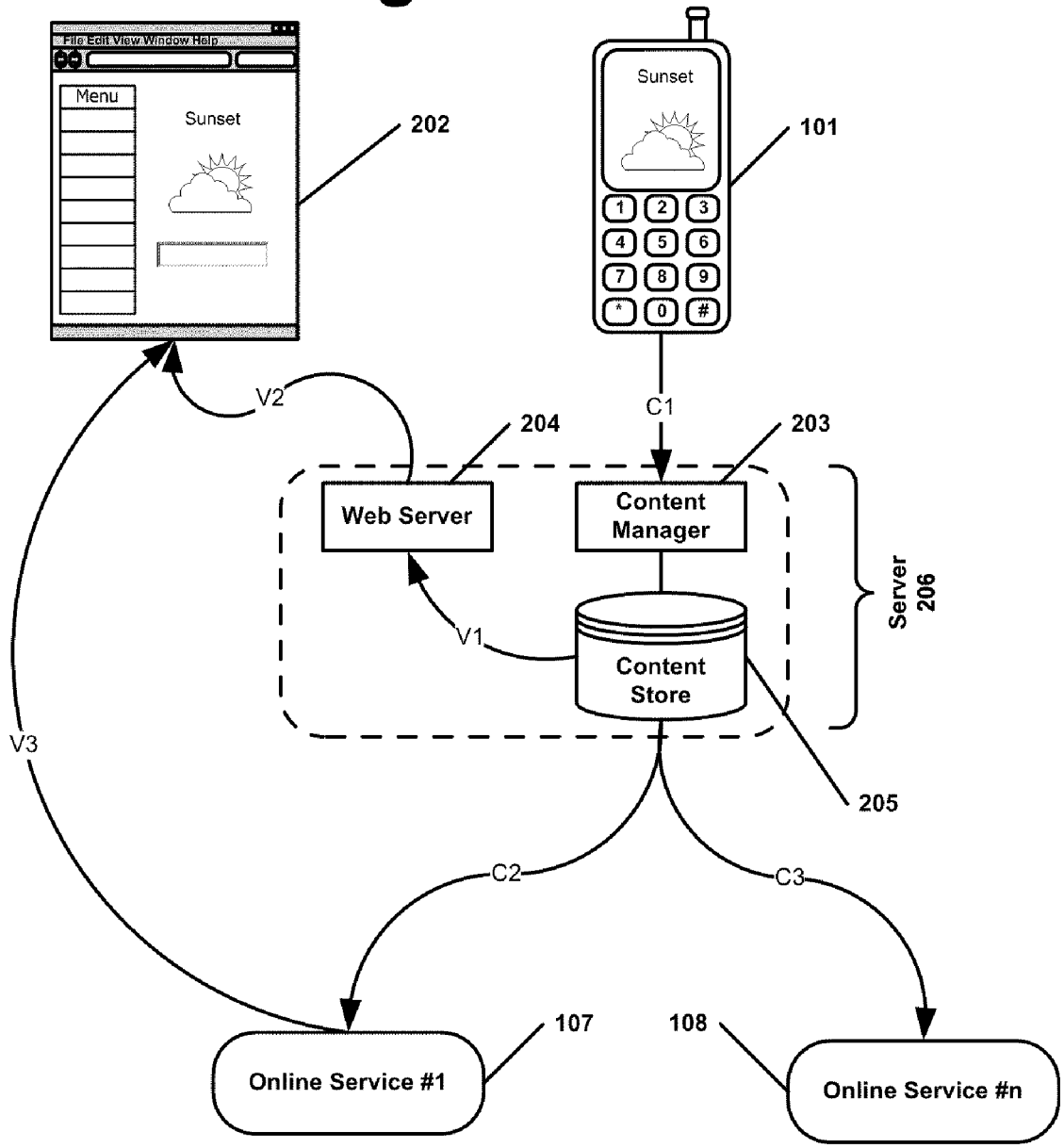
FIG. 2 shows the system according to an aspect of the invention being used to publish captured content to multiple locations.

FIG. 2 shows the system according to an aspect of the invention being used to publish captured content to multiple locations. In this embodiment, the system comprises mobile device 101 used to capture content, web browser 202 used to view content, content manager 203, used to store and distributed content, web server 204 used to make content visible to a web browser, content store 205, server 206 in which these application are running and a plurality of online services 107, 108.

FIG. 3 shows a representative screen of mobile device 101 used to capture content. This includes button 302 to save the content, content capture area 304, button 305 to control how content is to be shared, an area to select groups 306 to share the content with, an area to select specific users 307 to share with and an area to select online services 308 to share with. The mobile device provides a means to capture content in context 304, including, but not limited to, images and video captured using the camera of the device, and audio captured using the microphone of the device. In addition to the raw data, the mobile device may capture additional metadata, such a title, description, metadata tags, temporal context and geospatial context. The mobile device also includes button 302 to save the content, button 303 to cancel content creation, and button 305 to establish how the content is to be dispersed.

In this embodiment, the entire context—social, geospatial, and temporal—may be captured. The social context is established partly through metadata, but further, through the sharing context established by selecting the groups 306, users with relationships 307 and site 308 with which to share the content. This allows the mobile device user to determine how and to whom the content will be shared.

Having captured some content, edited metadata and established a sharing context, the mobile device user may choose to save the content through use of the save button 302. If the mobile device user chooses to do so, content capture device 101 will transmit (C1 in FIG. 2) the content to content manager 203. As with relationship manager 103 and message manager 105, content manager 203 is preferably a web application running within web server 206 exposed over the HTTP protocol.

Continuing to refer to FIG. 2, once content manager 203 has received (C1) the content item, it will first store the content item in content storage manager 205. Content store 205 is preferably a relational database augmented with a file system for storing large content items, though other embodiments are possible as those skilled in the relevant art will recognize. This preferably will have the immediate effect of exposing the content item (V1) to web server 204 which in turn will make the content item visible (V2) on the World Wide Web such that browsers 202 or other applications may access it. Note that when the content item is exposed, it may be exposed in a context that provides additional navigation mechanisms or visual effects to provide enhanced viewing capabilities.

In addition to exposing the content item through web server 204, content manager 203 will preferably also transmit the content item to one or more users or online services 107, 108. In doing so, content manager 203 will contact relationship manager 103 in order to resolve user information as necessary, and resolve groups to a set of users. At the end of the resolution phase, content manager 203 will have a list of targeted users, and online services to which the content item should be dispersed. There is a distinction made between transmitting a replica of the content item, or replicating a reference to the content item. In the former, the content item, and much of its captured context is replicated to another user or online service 108. In the latter, only a reference, for example, a URL with an associated message, is replicated to another user or online service. In the general case, the latter is preferable, where applicable, because less data is transmitted, but more importantly, the canonical data will reside in only one place, giving the mobile device user greater control over the content. In some cases, this may not be possible, or applicable. For example, in a photograph sharing online service, it may not be possible to share a photograph on the service without uploading the actual content. In such cases a full replica will, possibly at the discretion of the mobile device user, be transmitted.

Content manager 204 examines the list of targeted users and online services, and using heuristics and configuration information, determines the most appropriate means to transfer content. These heuristics and configuration items include, but are not limited to, rules derived from published API's for online services, and mobile device user preferences. Having determined the most appropriate form in which to share the content item, content manager 204 will then transmit (C2), (C3) the content item to the other online services 107, 108, which may then also expose the content item to the World Wide Web via a URL (V3) making it accessible to browsers and other applications. If the targeted user is also a user of the present invention, the replication will typically take the form of a message sent directly to the user via message manager 105. Where the targeted user is neither a member of another online service, nor a user of the present invention, a best effort will be made to transmit a reference or replica of the content item, for example, by sending an email, or an SMS message with a URL to the content item.

Note that while the process as described above is primarily used to disperse content across a plurality of online services 107, 108, the present invention is not limited to such a usage. Aspects of the present invention will use a polling mechanism similar to that used in message manager 105 to detect content items that have been added on other online services 107, 108, and can add an entry in content store 205 to correspond to that content item, either by replication or reference.

What is claimed is:

1. A system for managing relationships on a mobile device, the system comprising:
    a computer readable memory,
    a relationship database that is operable to store and retrieve computer-readable data;
    a message database that is operable to store and retrieve computer-readable data;
    executable instructions stored on the computer readable memory for implementing a relationship manager, capable of communicating relationship information updates with the mobile device, maintaining relationship information for a mobile device user in the relationship database, and propagating relationship information from the relationship database to a plurality of online services, wherein the relationship information maintained by the relationship manager includes at least one of a contact database, an email database, and an instant message contact list;
    executable instructions stored on the computer readable memory for implementing a messaging manager, capable of communicating message information updates with the mobile device, relaying multicast messages to a plurality of online services, retrieving messages from a plurality of online services and storing the retrieved messages in the message database; and
    executable instructions stored on the computer memory for prompting the mobile device user with a recommendation to form a relationship, wherein the prompting is based at least in part on at least one of geospatial proximity, social proximity, and temporal proximity.

2. The system of claim 1, wherein the messaging manager and the relationship manager are web applications running on web servers exposed via HTTP to the mobile device and wherein the relationship database is a relational database.

3. The system of claim 1, wherein relationship information updates include at least one of relationship addition, relationship subtraction, contact update, and contact suggestions.

4. The system of claim 1, wherein the messages include at least one of textual messages, picture messages, video messages, suggestions, and links to relevant information.

5. The system of claim 1, wherein the relationship database is a contact database provided by an operating system of the mobile device.

6. The system of claim 1, further comprising:
    a content manager for receiving content items from the mobile device, for dispersing content to a plurality of online services, and for retrieving content from a plurality of online services; and
    a content store for storing content items.

7. The system of claim 6, wherein the content manager is a web application running on a web server exposed via HTTP to the mobile device and wherein the content store is a relational database.

8. A method of managing relationships on a mobile device, the method comprising:
    authenticating a mobile device user with a relationship manager;
    associating a unique identifier with the mobile device user;
    storing the unique identifier in a relationship store;
    storing relationship information associated with the mobile device user in the relationship store, said relationship information comprising at least one of a contact database, an email database, and an instant message contact list;
    prompting the mobile device user with a recommendation to form a relationship, wherein the prompting is based at least in part on at least one of geospatial proximity, social proximity, and temporal proximity; and
    allowing the mobile device user to manage and synchronize relationships across a plurality of relationship databases and a plurality of online services.

9. The method of claim 8, further comprising prompting the mobile device user to create an account in the relationship manager.

10. The method of claim 8, wherein at least one relationship database is stored on the mobile device.

11. The method of claim 10, wherein the relationship database stored on the mobile device includes at least one of a contact database, an email database, and an instant message contact list.

12. The method of claim 8, wherein the relationship manager is a web application running on a web server exposed via HTTP to the mobile device and wherein at least one relationship database is a relational database.

13. The method of claim 8, wherein managing relationships includes at least one of relationship addition, relationship subtraction, contact update, and contact suggestions.

14. The method of claim 8, further comprising allowing the mobile device user to send and receive messages with other users.

15. The method of claim 14, wherein sending and receiving messages with others users is via at least one online service.

16. The method of claim 8, further comprising providing to the mobile device user a consolidated message list for sending messages.

17. The method of claim 8, further comprising allowing the mobile device user to share content captured from the mobile device with a plurality of online services or with a plurality of other users.

18. The method of claim 8, further comprising polling online services either for changes to relationships maintained in said online services or for detecting content items added to said online services.

* * * * *